US006030922A

United States Patent [19]
Khalili et al.

[11] Patent Number: 6,030,922
[45] Date of Patent: Feb. 29, 2000

[54] SYNTHESIZING CARBON FROM SLUDGE

[75] Inventors: Nasrin R. Khalili, Naperville; Hamid Arastoopour, Downers Grove; Laura K. Walhof, Chicago, all of Ill.

[73] Assignee: Illinois Institute of Technology, Chicago, Ill.

[21] Appl. No.: 09/113,657

[22] Filed: Jul. 10, 1998

[51] Int. Cl.⁷ ...................................................... B01J 20/02
[52] U.S. Cl. .......................... 502/424; 502/423; 502/428; 502/430
[58] Field of Search ................................. 502/424, 428, 502/430, 423

[56] References Cited

U.S. PATENT DOCUMENTS

| | | | |
|---|---|---|---|
| 1,777,943 | 10/1930 | Threlfall | 502/424 |
| 1,903,705 | 4/1933 | Nikaido | 502/426 |
| 2,040,931 | 5/1936 | Fuchs | 502/426 |
| 2,508,474 | 5/1950 | Slyh et al. | 502/424 |
| 3,835,064 | 9/1974 | Shinomiya et al. | 502/425 |
| 3,849,332 | 11/1974 | Bailey et al. | 502/423 |
| 3,998,756 | 12/1976 | Sutherland | 502/426 |
| 4,122,036 | 10/1978 | Lewis | 201/2.5 |
| 4,204,979 | 5/1980 | Hobbs et al. | 502/433 |
| 4,544,650 | 10/1985 | Kinder et al. | 502/424 |
| 4,957,897 | 9/1990 | Maroldo et al. | 502/432 |
| 5,102,855 | 4/1992 | Greinke et al. | 502/424 |
| 5,162,286 | 11/1992 | MacDowall | 502/425 |
| 5,304,527 | 4/1994 | Dimitri | 502/425 |
| 5,460,699 | 10/1995 | Bilan et al. | 201/25 |
| 5,589,599 | 12/1996 | McMullen et al. | 585/240 |

*Primary Examiner*—Steven P. Griffin
*Assistant Examiner*—Stuart L. Hendrickson
*Attorney, Agent, or Firm*—Pauley Petersen Kinne & Fejer

[57] ABSTRACT

The synthesis of carbon, particularly in an activated form, from sludge materials such as composed of biosolids and the like is described wherein the treated material is subjected to processing including chemical activation, light and humidity treatment, pyrolysis and physical activation to result in an activated carbon of high surface area and microporosity.

17 Claims, 2 Drawing Sheets

SYNTHESIZING CARBON FROM SLUDGE

BACKGROUND OF THE INVENTION

This invention relates generally to the synthesis of carbon, particularly in an activated form, from sludge and, in particular, from waste sludge such as composed of biosolids and the like.

In view of factors such as increased relative quantities of sludge materials such as produced or formed at wastewater treatment, paper mill processing and the like facilities and limited disposal areas for such sludge materials, there is an increasing need and demand for processing techniques whereby such sludge materials can be transformed or converted into other, possibly more desirable and useful, materials.

Biosolids is the waste sludge such as produced at wastewater treatment facilities and as may result from various bioreactions. Biosolids, also sometimes called or referred to as the sludge or residue of sewage treatment processes, are typically nutrient-rich by-products of specially treated or stabilized wastewaters originating from municipalities, industries or storm water runoff, for example, and typically produced in relatively high mass rates.

Activated carbon is a frequently used adsorbent material and has virtually displaced many other materials in use as adsorbents in various solvent recovery systems. Activated carbon is a generally superior adsorbent at least in part because of desirable surface properties. The unique adsorption capability of activated carbons is generally related to such carbon materials having a high adsorption capacity and a high degree of surface porosity and such as may relate to carbon materials desirably having relatively high surface areas and significant microporous structure. In general, pores are classified by size in one of three categories or classes: micropores (pores having a width less than 2 nm), mesopores (pores having a width of 2 nm and 50 nm), and macropores (pores having a width in excess of 50 nm).

Activated carbons are used extensively for or in various industrial applications including: solvent recovery, gas refining, air purification, exhaust desulfurization, deodorization and gas separation and recovery, for example. The application of activated carbons in water treatment includes: removal of color, odor, taste or other undesirable impurities from water; treatment of domestic and industrial wastewaters; and collection and recovery of solutes such as gold and silver, for example. In addition, activated carbons have found application as catalysts in various chemical processes.

In practice, the activity as well as possibly the effectiveness of such carbon material in particular adsorbent or catalyst applications may be limited by either or both the surface area and porosity of the activated carbon material. The production or formation of such activated carbon material from selected chemical processing waste streams has been generally limited or restricted due to limitations in either or both the surface area and porosity of the resulting activated carbon material.

Thus, there is a need and a demand for economical and environmentally sound solutions to biosolids management and reuse at treatment facilities at various locations in the world. In particular, there is a need and a demand for techniques whereby such raw material or wastewater streams can be processed or otherwise treated such as to produce or form activated carbon of either or both increased surface area and increased microporosity. Further, there is a need and a demand for activated carbon having either or both increased surface area and increased microporosity and such as formed from such process streams.

SUMMARY OF THE INVENTION

A general object of the invention is to provide an improved method for producing activated carbon.

Another general object of the invention is to provide an activated carbon of high surface area and microporosity such as formed from a carbon-containing sludge raw material.

A more specific objective of the invention is to overcome one or more of the problems described above.

The general object of the invention can be attained, at least in part, and the invention encompasses in accordance with one embodiment a specified method for producing activated carbon from a carbon-containing sludge raw material. Such method includes a pretreatment step of drying a carbon-containing sludge followed by crushing and sieving to form a dried sludge material. The dried sludge material is chemically activated to form a chemically-activated sludge material which is crushed and dried to form a dry crushed chemically-activated material. The dry crushed chemically-activated material is subjected to high energy light activation in an environment having a relative humidity of at least 50 percent to form an energy-treated chemically-activated sludge material. The energy-treated chemically-activated sludge material is pyrolyzed at an elevated temperature effective to form a pyrolyzed sludge material of increased microporosity which is cooled, crushed, rinsed, dried and then physically activated forming the activated carbon.

The prior art fails to provide as simple, economical and environmentally sound solution as desired to the management and reuse of sludge materials such as biosolids at treatment facilities at various locations in the world. More particularly, the prior art fails to provide for the synthesis of activated carbon of either or both increased surface area and increased microporosity from sludge materials such as composed of biosolids and the like.

The invention further comprehends a method for producing activated carbon from a carbon-containing biosolids sludge raw material. In accordance with one such method, a carbon-containing biosolids sludge is dried, crushed and sieved to form a dried sludge material. An aqueous solution of a metal-based chemical activation agent is added to the dried sludge material to form a chemically-activated sludge material containing at least a portion of the metal of the chemical activation agent. The chemically-activated sludge material is crushed and dried to form a dry crushed chemically-activated material. The dry crushed chemically-activated material is exposed to light having an average intensity of 50 microwatts and in an environment having a relative humidity of about 60 percent to about 70 percent to promote oxidation of metal contained within the dry crushed chemically-activated material forming a light and humidity treated activated sludge material. The light and humidity treated chemically-activated sludge material is pyrolyzed at a temperature in the range of about 775° C. and about 825° C. to form a pyrolyzed sludge material of increased microporosity. The pyrolyzed sludge material is subsequently cooled, crushed, rinsed and dried. The so processed sludge material is then treated with an activating gas to remove residual gases, followed by heating the treated pyrolyzed sludge material in the presence of the activating gas to at least partially oxidize the surface and expand the pores of the treated pyrolyzed sludge material forming activated carbon.

The invention still further comprehends activated carbon of high surface area and microporosity formed from such carbon-containing sludge raw materials using such a process.

As used herein, references to a sludge material as having a "high organic content" are to be understood to sludge materials which are composed of at least about one-third organic materials and, preferably sludge materials having an organic content in the range of about 35 to about 75 weight percent.

Other objects and advantages will be apparent to those skilled in the art from the following detailed description taken in conjunction with the appended claims and drawings.

DETAILED DESCRIPTION OF THE INVENTION

The present invention generally provides an improved method for producing activated carbon as well as an activated carbon of high surface area and microporosity such as formed from a carbon-containing sludge raw material.

Figure 1:
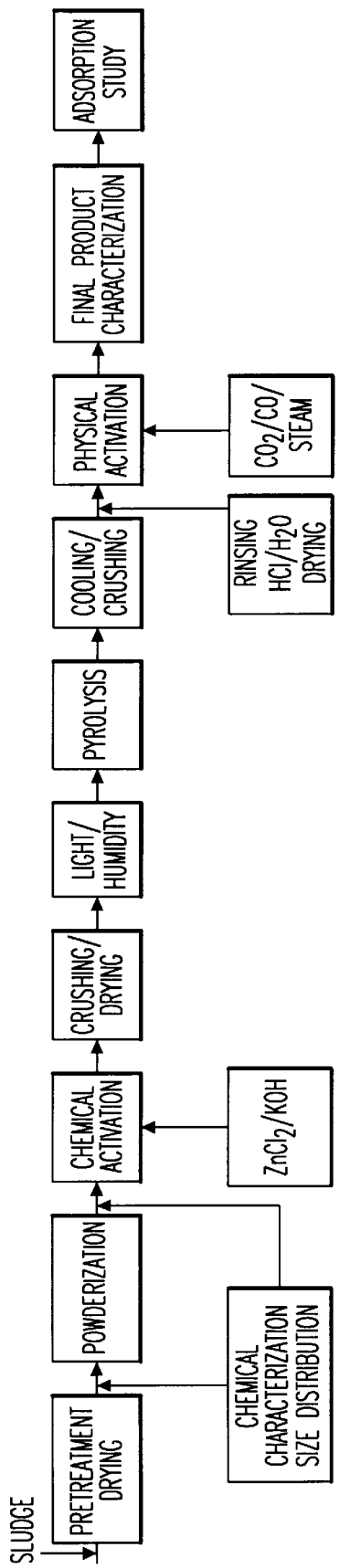
FIG. 1 is a simplified process flow diagram, in accordance with one embodiment of the invention, for the formation of activated carbon from a sludge material.

Referring to FIG. 1, a simplified flow diagram of a process for the formation of activated carbon from a sludge material in accordance with one embodiment of the invention is shown. As shown, the sludge is processed by first being dried. Such drying serves to reduce or minimize the water content of the material being processed. Further, such drying desirably results in a dried sludge material of greater uniformity and consistency, at least with respect to moisture content, regardless of the source of the sludge material.

The dried sludge material is then crushed or powderized, followed by sizing such as by being sieved. In practice, particles sized between 88 and 590 microns are desirably selected as such sized particles are generally small enough to properly and more completely react with a chemical activation agent, such as described below, while being large enough to minimize or avoid dust problems upon subsequent processing.

The sized, dried sludge material then undergoes chemical activation. Such chemical activation is typically effected by the addition of a chemical activation agent to the sludge material being processed. Chemical activation agents useful in the practice of the invention typically are metal-based and may, desirably be added to the sludge material being processed in the final form of an aqueous solution.

Useful or desirable chemical activation agents may include zinc chloride and potassium hydroxide, for example. Further, such chemical activation agents desirably can be added to the sludge material being processed in the form of a 5 molar aqueous solution, for example.

Such chemical activation agents can serve to bind sludge components, such as metals, into the sludge matrix such that upon subsequent removal of such metals, holes or pores remain in the so processed material. Further, the addition of such an aqueous solution of a metal-based chemical activation agent may also serve to at least in part hydrate the material being processed such that during subsequent pyrolysis treatment, steam generation can occur. As described in greater detail below, such steam generation may desirably contribute to enhancing the porosity of the processed material.

The chemically-activated sludge material then undergoes crushing and drying, followed by light and humidity treatment. More specifically, the dry crushed chemically-activated material is subjected to high energy light activation while in an environment having a relative humidity of at least 50 percent, preferably in the range of about 60 percent to about 70 percent, to form an energy-treated chemically-activated sludge material. In practice, exposure to light having an average intensity of at least about 50 microwatts at room temperature for a duration of about 22 hours has been found to result in a product having increased surface area.

While the mechanics by which such high energy activation produces or results in such increased surface area are not currently known, it is hypothesized that the high energy of such light exposure promotes oxidation, such as of zinc if zinc chloride has been used as a chemical activation agent. Such oxidation may in turn result in the formation of larger molecules (e.g., zinc oxide) within the sludge matrix, with the subsequent removal of such larger molecules leading to the material having increased surface area.

The light and humidity treated chemically-activated sludge material then undergoes pyrolysis treatment at an elevated temperature such as effective to form a pyrolyzed sludge material of increased microporosity. In practice, pyrolysis temperatures in the range of greater than about 750° C. and less than about 850° C., preferably about 775° C. and about 825° C., have been found to desirably result in processed material having a higher surface area and increased porosity as compared to similar materials pyrolyzed at temperatures outside such temperature ranges.

During such pyrolysis processing, carbon in the sludge material partially oxidizes under $N_2$ gas, leaving holes or pores in the sludge material. In addition, many of the other components present in or as a part the sludge material, including any water present therein, are melted and/or evaporated, such as may generate small gas bubbles which contribute to the microporosity of the resulting material.

Subsequent to such pyrolysis treatment, the pyrolyzed sludge material is cooled and crushed or powderized. The resulting sludge material, if desired, can be rinsed, such as with HCl followed by water and such as may be desired to remove or recover metals therefrom. For example, such rinsing may be desired to permit recovery and, if desired, reuse of zinc when, for example, a zinc-containing chemical activation agent such as zinc chloride has been used. Such a rinsed material can then be appropriately dried such as may be desired to facilitate subsequent processing.

The so processed pyrolyzed sludge material subsequently undergoes physical activation. In practice, such physical activation can typically be effected by treating the sludge material with an activating gas to remove residual gases, followed by heating the sludge material in the presence of the activating gas to at least partially oxidize the surface and expand the pores of the pyrolyzed sludge material forming the activated carbon product. More specifically, the processed sludge material can be exposed to an activating gas such as composed of $CO_2$, for example, such that the $CO_2$ can diffuse into the micropores of the sludge material and replace any residual gases which may be present therein. The sludge material can then be heated in the presence of CO and $CO_2$ such that the surface of the sludge material is at least partially oxidized and at least slightly expanded pores are developed in the activated carbon product.

As shown, and if desired, the final product can then be characterized and/or subject to adsorption study. For example and in accordance with known techniques, the product material can be exposed to nitrogen gas at various pressures and the volume of nitrogen gas adsorbed by the product measured or determined to obtain an isotherm curve. As is known, this data can be manipulated so as to obtain the surface area and pore distribution for the material under investigation.

Carbon-containing sludge raw materials processible in accordance with the invention can take various forms. Criteria for choosing a carbonaceous raw material for activation and the production of an adsorbing product typically may include: the presence of minimum relative amounts of inorganics (e.g., the material produces or results in a low ash content) as well as the volume, cost, storage life and workabiltiy of the raw material. The practice of the invention in the processing of a sludge raw material which has a high organic content is generally particularly preferred as a high organic content raw material is generally more conducive to forming activated carbon for such uses as an adsorbent or catalyst.

Examples of sludge materials having high organic contents which are believed to be particularly suited for processing in accordance with the invention include biosolids and cellulosic paper mill sludge. As identified above, biosolid sludge typically has a high carbon content. In addition, biosolid sludge typically has a very low ash content, is available in relatively large quantities at relatively low cost, typically improves in properties with age due to anaerobic and aerobic digestion, and is available in many different specific compositional forms based on water, nitrogen, phosphorus and/or metal content. Typical biosolid materials are reported to have a BTU/lbm value in the range of 8000–10000.

The activated carbon materials produced in accordance with the invention can find extensive application in removing organic and inorganic materials and pollutants from various process streams such as including various industrial and municipal waste streams. Possible process stream applications for such sorbent materials may include gas phase adsorption of pollutant gases such as nitrous oxide, sulfur compounds, and volatile organic compounds (VOC's) as well as liquid phase adsorption of various organic pollutants. As will be appreciated, sorbent products produced via the invention can, if desired, be used instead of commercially available carbons at typically greatly reduced costs.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Examples 1–5

A sample of biosolids sludge material was collected, after aerobic digestion, at a wastewater treatment facility from the centrifuge. The composition of the sludge sample was analyzed and selected analytic results for the dried centrifuge cake starting material are shown in TABLE 1, below.

TABLE 1

| Component | Mass % of Sample |
|---|---|
| Loss on Drying | 2.54 |
| Carbon | 36.59 |
| Hydrogen | 5.09 |
| Nitrogen | 5.84 |
| Sulfur | 0.95 |
| Total Halogens as Cl | <0.5 |
| Ash | 28.34 |
| Oxygen (by difference) | 23.19 |
| Detected Metals (ppm) | As, Cd, Cu, Cr, Pb, Mn, Hg, Mb, Ni, Se, Zn |

Figure 2:
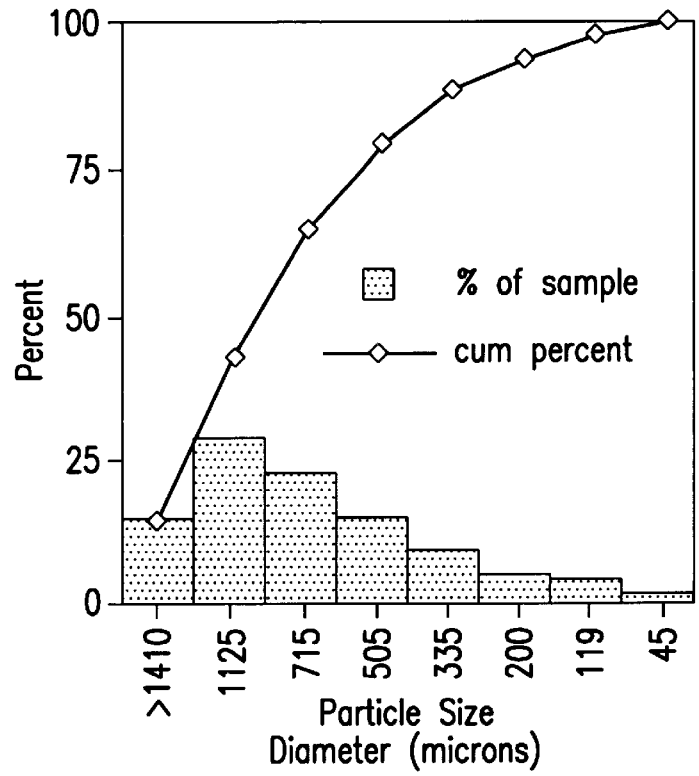
FIG. 2 is a graphical representation of the particle size distribution of the dried sludge used in Examples 1–5.

The centrifuge cake was dried at 108° C. for 24–36 hours and crushed before undergoing chemical activation. The pore size distribution of the crushed dried sludge is shown in FIG. 2. The mass average particle size was 660 microns.

Crushed and dried biosolids and anhydrous zinc chloride were mixed in a 1:1 mass ratio and water was added to make 5M $ZnCl_2$. This slurry was stirred continuously for 7 hours at 85° C., and then dried at 108° C. overnight. The resulting solid was crushed again and pyrolyzed under constant nitrogen flow at selected temperatures. The hold time at the maximum temperature was 2 hours. The heating rate was approximately 20° C./minute. After pyrolysis, the samples were crushed, rinsed with 1M HCl and distilled water to remove $ZnCl_2$, and dried. The surface area of the produced carbon-based adsorbents were evaluated using nitrogen adsorption isotherms and the BET model. Isotherm data was collected with a Coulter SA 3100 plus $N_2$-BET automatic instrument.

RESULTS AND DISCUSSION

By varying pyrolysis temperature, with one type of chemical activation agent and one type of sludge, the effects of temperature on the production of activated carbon were assessed. These effects were shown on the overall surface area, the adsorption isotherms, and the pore size distribution.

A. Surface Area

The results showed that surface area for the produced carbons was highly influenced by pyrolysis temperature. TABLE 2, below, shows the measured $N_2$-BET surface area for carbons produced at select pyrolysis temperatures. As shown in TABLE 2, the surface area increased with pyrolysis temperature up to 750° C. and then leveled off and began to decrease at 850° C. Two separate mechanisms are believed to be responsible for the increase in surface area. First, pores were generated due to gas evolution during initial increases in temperature. Also, as temperature increased, the larger pores partially closed, causing a shift from larger pores to smaller ones.

TABLE 2

| Example | Pyrolysis Temperature (° C.) | BET Surface Area (m²/g) |
|---|---|---|
| 1 | 650 | 208 |
| 2 | 700 | 572 |
| 3 | 750 | 648 |
| 4 | 800 | 652 |
| 5 | 850 | 569 |

B. Adsorption Isotherms

Figure 3:
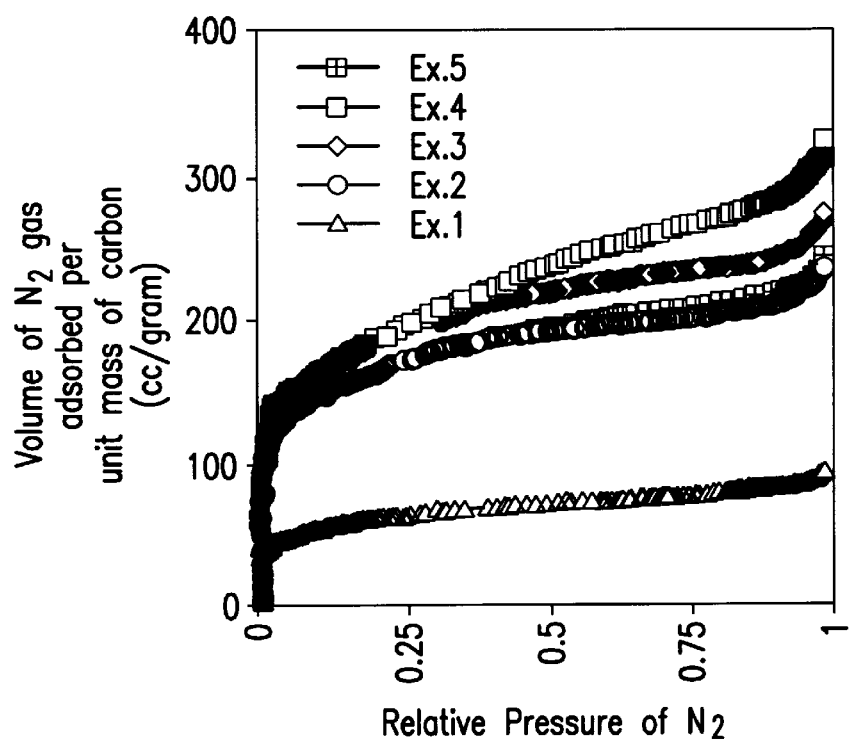
FIG. 3 is a graphical representation of the nitrogen adsorption isotherms corresponding to each of Examples 1–5.

FIG. 3 shows the nitrogen adsorption isotherms for the carbons produced in this study. It is clear that the adsorption capacity of the carbon increased with temperature up to 800° C. (Examples 1–4), and decreased as temperature was increased thereafter (Example 5). The total volume adsorbed by each carbon increased with temperature at all partial pressures, except in Example 5. This indicates that at 850° C., the adsorption capacity of the product began to attenuate.

The shapes of the five isotherm curves were very similar, representing a Type 4 isotherm, as defined by Gregg and Sing in *Adsorption, Surface Area, and Porosity*, Academic Press, London (1982). A Type 4 isotherm indicates microporous and mesoporous material. As temperature increased, the higher slope for adsorption curves at relative pressures greater than 0.4, was a result of formation of mesopores. The knee in the isotherm became less defined as the temperature increased to 800° C. (Example 4). This result can be interpreted to indicate that there was less distinction between micropores and mesopores because some micropores expanded and entered the mesopore range. However, at the same time, more micropores were formed, causing an increase in microporosity at higher pyrolysis temperatures. This conclusion is supported by the pore size distribution data.

C. Pore Size Distribution

The effect of temperature on pore development can be examined further by observing the changes in pore size distribution with temperature, as reported in TABLE 3, below.

TABLE 3

| Pore size (nm) | Ex. 1 | Ex. 2 | Ex. 3 | Ex. 4 | Ex. 5 |
| --- | --- | --- | --- | --- | --- |
| % of pores <6 | 22.17 | 27.1 | 29.9 | 37.0 | 33.9 |
| 6–8 | 8.13 | 6.87 | 6.78 | 9.79 | 7.38 |
| 8–10 | 4.43 | 3.73 | 3.32 | 4.15 | 3.42 |
| 10–12 | 5.29 | 4.04 | 3.64 | 3.95 | 3.99 |
| 12–16 | 7.02 | 5.18 | 4.68 | 4.20 | 4.44 |
| 16–20 | 7.74 | 6.11 | 5.72 | 4.56 | 5.20 |
| 20–80 | 30.5 | 29.8 | 29.5 | 21.4 | 27.3 |
| over 80 | 14.7 | 17.2 | 16.5 | 15.0 | 14.3 |

In these examples, the pores in the under 6 nm range increased with increasing pyrolysis temperature up to 800° C. Based on conventional classification, this range includes both micropores and some mesopores. When the pyrolysis temperature was increased to 850° C. (Example 5), the total surface area and percent of these small pores decreased. It is believed that micropores were expanding to become mesopores. The decrease in microporosity is accompanied by an increase in the percentage of pores in the 20–80 nm range.

CONCLUSIONS

Biosolids produced at a municipal wastewater treatment plant can be used as a precursor to produce a carbon-based adsorbent. The effect of temperature during pyrolysis was evaluated. It was shown that the surface area increases and the number of pores under 6 nm increased as pyrolysis temperature increased to 800° C. Further increasing the temperature resulted in a decrease in microporosity.

In choosing an optimal pyrolysis temperature, both minimizing energy costs and maximizing surface area must be considered. Clearly, Examples 3 and 4, with surface areas at approximately 650 $m^2/g$, represented a maximum surface area which could be obtained under experimental conditions. Depending on the application proposed for the carbon, Example 4, with greater porosity under 6 nm, may be better suited. However, based on energy costs, pyrolysis at 750° C., Example 3, may be preferred.

Examples 6 and 7

To highlight the significance of the inclusion of the light and humidity activation in subject processing scheme, two samples of a biosolid sludge material were used. The first sample, i.e., Example 6, was subjected to processing in accordance with the above-described FIG. 1 including exposure to light at an average intensity of 50 microwatts at a relative humidity of 63% for a duration of 22 hours. The second sample, i.e., Example 7, was subjected to the same treatment and conditions except it did not undergo light and humidity activation as it was not so exposed to light and humidity.

The BET surface area (reported in $m^2/gram$) and the microporosity (reported in percentage of all pores) of the final carbon products obtained in Examples 6 and 7 were then determined, as described above. These results are reported in TABLE 4, below

TABLE 4

| Example | BET Surface Area | Microporosity |
| --- | --- | --- |
| 6 | 613 | 24 |
| 7 | 568 | 24 |

Discussion of Results

As shown in TABLE 4, the inclusion of the step of light and humidity activation treatment in the subject processing scheme resulted in a dramatic increase (i.e., an increase of about 8%) in the surface area of the final product, as compared to the product of the same treatment and conditions except it did not undergo such light and humidity activation treatment. As described herein and as appreciated by those skilled in the art, such higher surface area carbon material can provide various product advantages and is thus believed to provide a significant benefit to the specified processing scheme.

It is to be understood that the discussion of theory, such as the discussion of the specific mechanics by which the described processing results in the carbon product having increased surface area and increased microporosity, for example, is included to assist in the understanding of the subject invention and is in no way limiting to the invention in its broader application.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method for producing activated carbon from a carbon-containing sludge raw material, said method comprising the steps of:

drying, crushing and sieving a carbon-containing sludge to form a dried sludge material;

chemically activating the dried sludge material to form a chemically-activated sludge material;

crushing and drying the chemically-activated sludge material to form a dry crushed chemically-activated material;

exposing the dry crushed chemically-activated material to light in an environment having a relative humidity of at least 50 percent to form a light-treated chemically-activated sludge material;

pyrolyzing the light-treated chemically-activated sludge material at an elevated temperature effective to form a pyrolyzed sludge material of increased microporosity, as compared to the light-treated chemically-activated sludge material prior to pyrolysis;

cooling, crushing, rinsing and drying the pyrolyzed sludge material; and treating the cooled, crushed, rinsed and dried pyrolyzed sludge material with an activating gas to remove residual gases, followed by heating the treated pyrolyzed sludge material in the presence of the activating gas to at least partially oxidize the surface and expand the pores of the treated pyrolyzed sludge material forming the activated carbon.

2. The method of claim 1 wherein the elevated temperature of said pyrolyzing step is in the range of greater than about 750° C. and less than about 850° C.

3. The method of claim 1 wherein the elevated temperature of said pyrolyzing step is in the range of about 775° C. and about 825° C.

4. The method of claim 1 wherein the carbon-containing sludge raw material comprises biosolids.

5. The method of claim 1 wherein the carbon-containing sludge raw material comprises a cellulosic paper mill sludge.

6. The method of claim 1 wherein said chemical activation step comprises adding an aqueous solution of a metal-based chemical activation agent to the dried sludge material to form the chemically-activated sludge material and which material contains at least a portion of the metal of the chemical activation agent.

7. The method of claim 6 wherein the metal-based chemical activation agent comprises zinc chloride.

8. The method of claim 7 wherein the cooled, crushed pyrolyzed sludge material is rinsed with HCl and water to recover $ZnCl_2$.

9. The method of claim 6 wherein the metal-based chemical activation agent comprises potassium hydroxide.

10. The method of claim 6 wherein the light treatment step comprises sufficiently exposing the dry crushed chemically-activated material to light to promote oxidation of metal contained within the chemically-activated sludge material forming the light-treated chemically-activated sludge material.

11. The method of claim 10 wherein the light has an average intensity of at least about 50 microwatts.

12. The method of claim 10 wherein the light treatment step is conducted in an environment having a relative humidity of about 60 percent to about 70 percent.

13. The method of claim 1 wherein the activating gas comprises carbon dioxide and carbon monoxide.

14. A method for producing activated carbon from a carbon-containing biosolids sludge raw material, said method comprising the steps of:

drying, crushing and sieving a carbon-containing biosolids sludge to form a dried sludge material;

adding an aqueous solution of a metal-based chemical activation agent to the dried sludge material to form a chemically-activated sludge material containing at least a portion of the metal of the chemical activation agent;

crushing and drying the chemically-activated sludge material to form a dry crushed chemically-activated material;

exposing the dry crushed chemically-activated material to light having an average intensity of 50 microwatts and in an environment having a relative humidity of about 60 percent to about 70 percent to promote oxidation of metal contained within the dry crushed chemically-activated material forming a light and humidity treated chemically-activated sludge material;

pyrolyzing the light and humidity treated chemically-activated sludge material at a temperature in the range of about 775° C. and about 825° C. to form a pyrolyzed sludge material of increased microporosity, as compared to the light and humidity treated chemically-activated sludge material prior to pyrolysis;

cooling, crushing, rinsing and drying the pyrolyzed sludge material; and treating the cooled, crushed, rinsed and dried pyrolyzed sludge material with an activating gas to remove residual gases, followed by heating the treated pyrolyzed sludge material in the presence of the activating gas to at least partially oxidize the surface and expand the pores of the treated pyrolyzed sludge material forming activated carbon.

15. The method of claim 14 wherein the metal-based chemical activation agent comprises zinc chloride.

16. The method of claim 14 wherein the metal-based chemical activation agent comprises potassium hydroxide.

17. The method of claim 14 wherein the activating gas comprises carbon dioxide and carbon monoxide.

* * * * *